(12) United States Patent
Qiu et al.

(10) Patent No.: US 11,362,363 B2
(45) Date of Patent: Jun. 14, 2022

(54) BATTERY

(71) Applicant: NINGDE AMPEREX TECHNOLOGY LIMITED, Ningde (CN)

(72) Inventors: Shenzhao Qiu, Ningde (CN); Cheng Yuan, Ningde (CN)

(73) Assignee: NINGDE AMPEREX TECHNOLOGY LIMITED, Fujian (CN)

(*) Notice: Subject to any disclaimer, the term of this patent is extended or adjusted under 35 U.S.C. 154(b) by 73 days.

(21) Appl. No.: 16/197,227

(22) Filed: Nov. 20, 2018

(65) Prior Publication Data

US 2019/0198909 A1   Jun. 27, 2019

Related U.S. Application Data (63) Continuation of application No. PCT/CN2017/119026, filed on Dec. 27, 2017.

(51) Int. Cl.
  H01M 10/00   (2006.01)
  H01M 10/04   (2006.01)
  (Continued)

(52) U.S. Cl.
  CPC ........... H01M 10/045 (2013.01); H01M 4/04 (2013.01); H01M 50/116 (2021.01);
  (Continued)

(58) Field of Classification Search
  CPC ............ H01M 2/0275; H01M 10/045; H01M 50/531; H01M 50/116; H01M 50/543; H01M 50/183; H01M 4/04
  See application file for complete search history.

(56) References Cited

U.S. PATENT DOCUMENTS

| 6,319,630 B1* | 11/2001 | Hasegawa | ........... H01M 2/0202 429/124 |
| 2004/0048149 A1* | 3/2004 | Gross | .................. H01M 2/0267 429/127 |

(Continued)

FOREIGN PATENT DOCUMENTS

| CN | 201069784 Y | * | 6/2008 |
| CN | 203674276 U | | 6/2014 |

(Continued)

OTHER PUBLICATIONS

Machine translation of CN 201069784 Y (Year: 2008).*

(Continued)

*Primary Examiner* — Milton I Cano
*Assistant Examiner* — Mary G Henshaw
(74) *Attorney, Agent, or Firm* — Morgan, Lewis & Bockius LLP (57) ABSTRACT

The present application discloses a battery to reduce a height of an edgefold protrusion in a direction perpendicular to a top seal, reduce structural interference between the edgefold protrusion and other components and parts, and improve a structural compactness when a user utilizes the battery. The battery includes a cell, a packaging bag, and an electrode tab. The packaging bag includes a first packaging portion configured to accommodate the cell and a second packaging portion configured to seal the cell. The second packaging portion includes a top seal configured to seal the electrode tab and two side seals intersecting the top seal. A notched structure is formed at an intersection of the top seal and the side seal. The side seal is folded over along an edge of the side seal adjacent to the first packaging portion and fixed to an outer side surface of the first packaging portion.

15 Claims, 9 Drawing Sheets

(51) Int. Cl.
  *H01M 4/04* (2006.01)
  *H01M 50/116* (2021.01)
  *H01M 50/183* (2021.01)
  *H01M 50/531* (2021.01)
  *H01M 50/543* (2021.01)

(52) U.S. Cl.
  CPC ....... *H01M 50/183* (2021.01); *H01M 50/531* (2021.01); *H01M 50/543* (2021.01)

(56) References Cited

U.S. PATENT DOCUMENTS

| | | | | |
|---|---|---|---|---|
| 2005/0084749 A1* | 4/2005 | Hwang | ............. | H01M 50/3425 |
| | | | | 429/127 |
| 2005/0142439 A1* | 6/2005 | Lee | ....................... | H01M 2/021 |
| | | | | 429/163 |
| 2007/0196733 A1* | 8/2007 | Lee | ..................... | H01M 50/183 |
| | | | | 429/185 |

FOREIGN PATENT DOCUMENTS

| | | |
|---|---|---|
| CN | 203 800091 U | 8/2014 |
| CN | 105489939 A | 4/2016 |
| EP | 1524709 A2 | 4/2005 |
| JP | 2012003919 A * | 1/2012 |

OTHER PUBLICATIONS

Ningde Amperex Technology Limited, International Search Report and Written Opinion, PCT/CN2017/119026, dated Sep. 29, 2018, 13 pgs.

Ningde Amperex Technology Limited, Extended European Search Report, EP17936867.5, dated Jul. 13, 2021, 6 pgs.

* cited by examiner

BATTERY

CROSS REFERENCE TO RELATED APPLICATION

This application is a continuation of PCT Application No. PCT/CN2017/119026, filed on Dec. 27, 2017, the entire content of which is incorporated herein by reference.

FIELD

The present application relates to a technical field of batteries, more particularly to a lithium ion battery.

BACKGROUND

With advantages of high voltage, great specific energy, long cycle life, and good safety performance, lithium ion batteries are thus favored by many users. Compared with traditional lithium ion batteries, polymer lithium ion batteries have improved specific energy and safety performance whiling retaining the advantages of traditional lithium ion batteries. Currently, more and more electronic devices use lithium ion batteries as their power source, and lithium ion batteries are progressing toward high specific energy and high rate based on the increased requirements for lithium ion batteries in electrical equipment.

For a battery, a cell is typically sealed and packaged by a packaging bag. In the battery manufacturing process, the packaging bag is usually packaged at an end of the cell near an electrode tab to form a top seal, while it is packaged at two sides of the cell to form a side seal.

Figure 1:
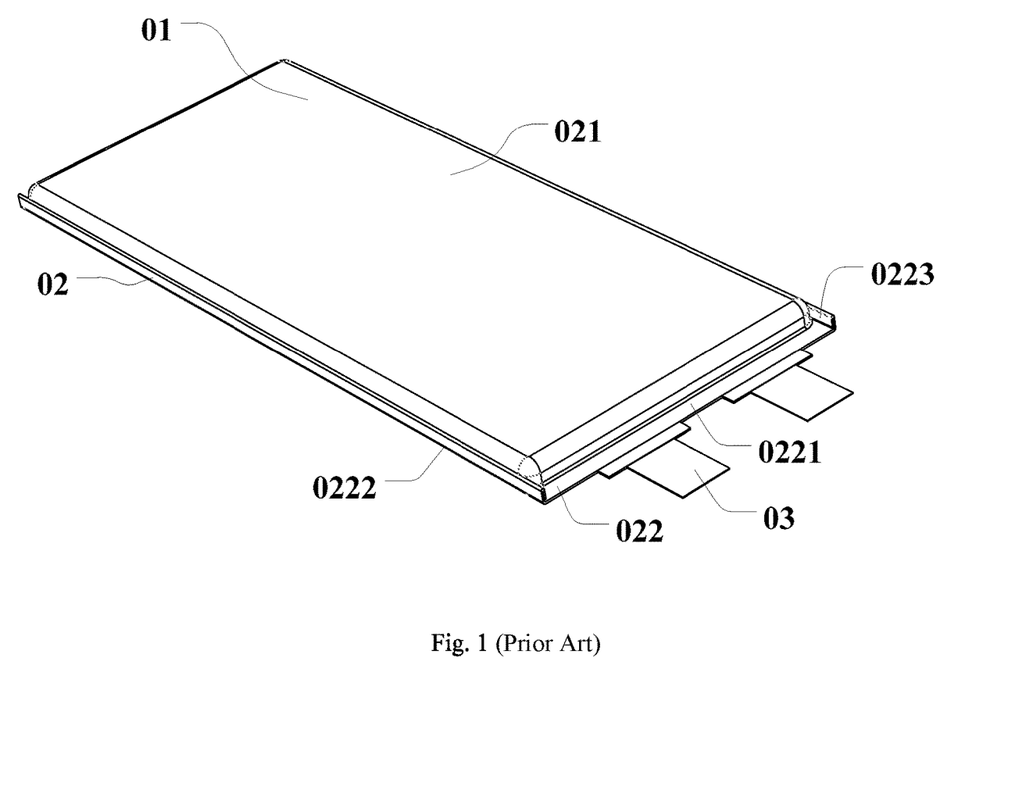
FIG. 1 is a structural schematic view of a battery in the related art.

Referring to FIG. 1, in the related art, the battery includes a cell 01, a packaging bag 02 for packaging the cell 01, and an electrode tab 03 connected with the cell 01. The packaging bag 02 includes a first packaging portion 021 for accommodating the cell 01, and a second packaging portion 022 formed by packaging the cell 01. The second packaging portion 022 includes a top seal 0221 configured to seal the electrode tab 03 and two side seals 0222 intersecting the top seal 0221. The side seal 0222 is folded over and fixed to an outer side surface of the first packaging portion 021 to form an edgefold, a part where the edgefold protrudes from the end of the cell 01 is referred to as an edgefold protrusion 0223, and the edgefold protrusion 0223 has a relatively great height in a direction perpendicular to the top seal 0221. When in use, the user needs to install components and parts at the end of the cell 01, which may easily cause structural interference with the edgefold protrusion 0223, resulting in a low integration level of the components and parts installed by the user.

SUMMARY

Embodiments of the present application aim to provide a battery to reduce height of an edgefold protrusion in a direction perpendicular to a top seal, reduce structural interference between the edgefold protrusion and other components and parts, and improve a structural integration level when a user utilizes the battery.

Embodiments of the present disclosure provide a battery. The battery includes: a cell, a packaging bag configured to package the cell, and an electrode tab connected with the cell. The packaging bag includes a first packaging portion configured to accommodate the cell and a second packaging portion configured to seal the cell. The second packaging portion includes a top seal configured to seal the electrode tab and two side seals intersecting the top seal. A notched structure is formed at an intersection of the top seal and the side seal. The side seal is folded over along an edge of the side seal adjacent to the first packaging portion and fixed to an outer side surface of the first packaging portion.

In a specific embodiment of the present disclosure, a projected length of an edge of the notched structure in a direction of a side edge of the top seal and a width of the side seal satisfy $L \leq W$, in which L represents the projected length, and W represents the width of the side seal.

In a specific embodiment of the present disclosure, the side seal includes a heat-seal zone and a non-sealed zone sequentially provided in a direction away from a side edge of the side seal, and a width of the heat-seal zone satisfies $\frac{1}{5}W \leq W_1 \leq \frac{4}{5}W$, in which $W_1$ is the width of the heat-seal zone, and W is the width of the side seal.

In a specific embodiment of the present disclosure, the width of the heat-seal zone satisfies $W_1 = \frac{2}{5}W$, in which $W_1$ is the width of the heat-seal zone, and W is the width of the side seal.

In a specific embodiment of the present disclosure, the edge of the notched structure includes an oblique edge or a curved edge.

In a specific embodiment of the present disclosure, the edge of the notched structure intersects a side edge of the top seal at point A, the edge of the notched structure intersects a side edge of the side seal at point B, and an angle α between a line connecting point A and point B and the side edge of the top seal satisfies $125° \leq \alpha \leq 145°$.

In a specific embodiment of the present disclosure, the angle α between the line connecting point A and point B and the side edge of the top seal satisfies $132° \leq \alpha \leq 138°$.

In a specific embodiment of the present disclosure, a side of the second packaging portion adjacent to the notched structure includes a folding portion, the folding portion is folded over and fixed to the second packaging portion, and the whole folding portion is superposed on a surface of the second packaging portion.

In a specific embodiment of the present disclosure, an edge of the notched structure intersects a side edge of the top seal at point A, the edge of the notched structure intersects a side edge of the side seal at point B, and after the folding portion is folded over and fixed to the second packaging portion, an angle β between a line connecting point A and point B and the side edge of the top seal satisfies $80° \leq \beta \leq 110°$.

In a specific embodiment of the present disclosure, the angle β between the line connecting point A and point B and the side edge of the top seal satisfies $87° \leq \beta \leq 93°$.

In a specific embodiment of the present disclosure, a folding line of the folding portion passes an intersection point between the edge of the notched structure and the side edge of the top seal.

In a specific embodiment of the present disclosure, the side seal is folded over and fixed to the outer side surface of the first packaging portion by means of a double-folded edge.

In a specific embodiment of the present disclosure, an adhesive layer is provided between the double-folded edge and the outer side surface of the first packaging portion.

In a specific embodiment of the present disclosure, an edge of the notched structure of the second packaging portion is provided with a sealing tape.

In a specific embodiment of the present disclosure, a side edge of the side seal is provided with a sealing tape.

In embodiments of the present disclosure, after the cell is packaged by the packaging bag of the battery, the second packaging portion has the notched structure, and specifically the notched structure is located at the intersection of the top seal and the side seal. In a specific embodiment where the notched structure refers to a structure that is cut off at the intersection of the top seal and the side seal, and in a finished battery, only an edge of the notched structure is visible. In a battery manufacturing process, the side seal is folded over along the edge of the side seal adjacent to the first packaging portion, and fixed to the outer side surface of the first packaging portion. For example, the side seal can be directly folded over and bonded to the outer side surface of the first packaging portion, such that the notched structure is located above an end of the cell to form an edgefold protrusion. The edgefold protrusion has the notched structure, and thus has a relatively low height in a direction perpendicular to the top seal. When the battery is in use, it is possible to reduce the structural interference between the edgefold protrusion and other components used cooperatively, and improve structural compactness and integration level when the user utilizes the battery.

BRIEF DESCRIPTION OF THE DRAWINGS

To describe technical solutions in embodiments of the present disclosure or in the relate art more clearly, the accompanying drawings used in the description of the embodiments or of the related art will be briefly described below. Obviously, the accompanying drawings described below show some embodiments of the present disclosure, and those skilled in the art can obtain other drawings based on these drawings without paying creative efforts.

REFERENCE NUMERALS

In the related art:
01—cell, 02—packaging bag, 021—first packaging portion, 022—second packaging portion, 0221—top seal, 0222—side seal, 0223—edgefold protrusion, 03—electrode tab In the present application:
1—cell, 2—packaging bag, 21—first packaging portion, 22—top seal, 221—side edge of top seal, 23—side seal, 231—side edge of side seal, 232—first folding line, 24—notched structure, 241—edge of notched structure, 25—folding portion, 26—edgefold protrusion, 3—electrode tab.

DETAILED DESCRIPTION

Technical solutions in embodiments of the present disclosure will be clearly and completely described below with reference to the accompanying drawings in the embodiments of the present disclosure in order to make the objectives, technical solutions and advantages of the embodiments of the present disclosure clearer. Obviously, the embodiments described herein are only a part but not all of the embodiments of the present disclosure. Based on the embodiments of the present disclosure, all other embodiments obtained by those skilled in the art without paying creative efforts, fall into the protection scope of the present disclosure.

Figure 2:
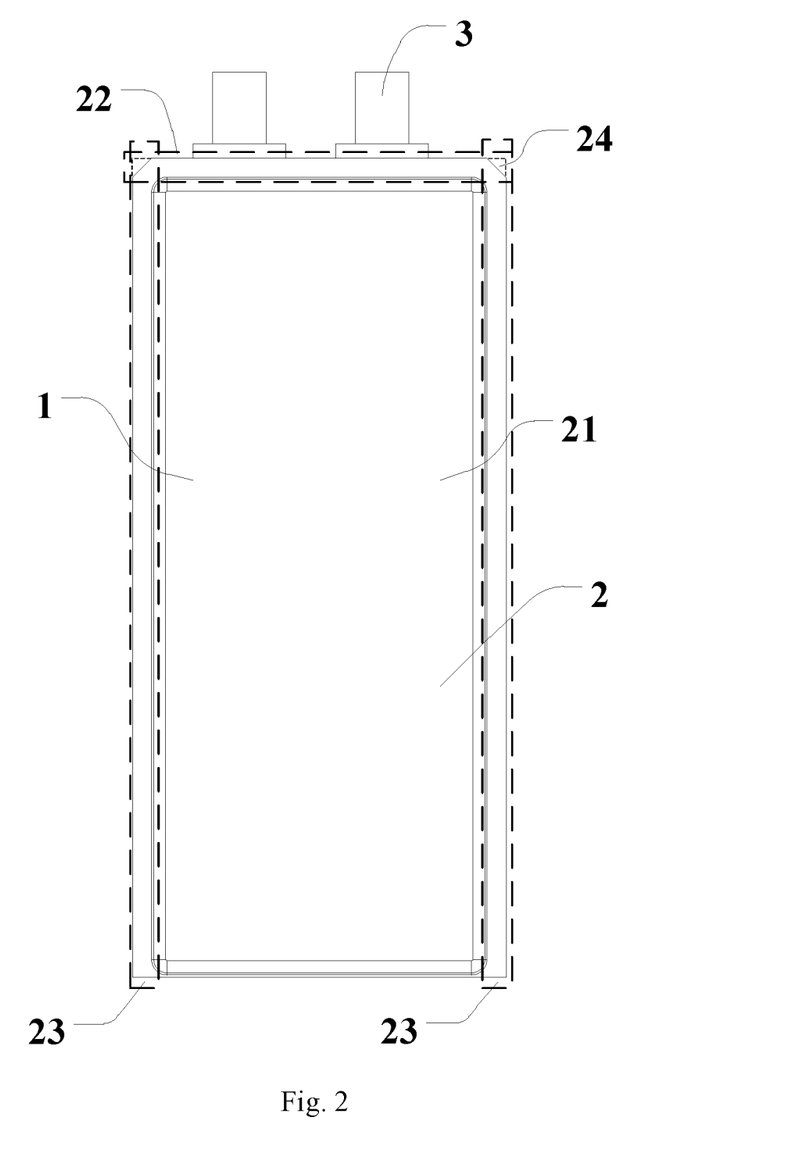
FIG. 2 is a structural schematic view of a battery according to a first embodiment of the present application.
Figure 3:
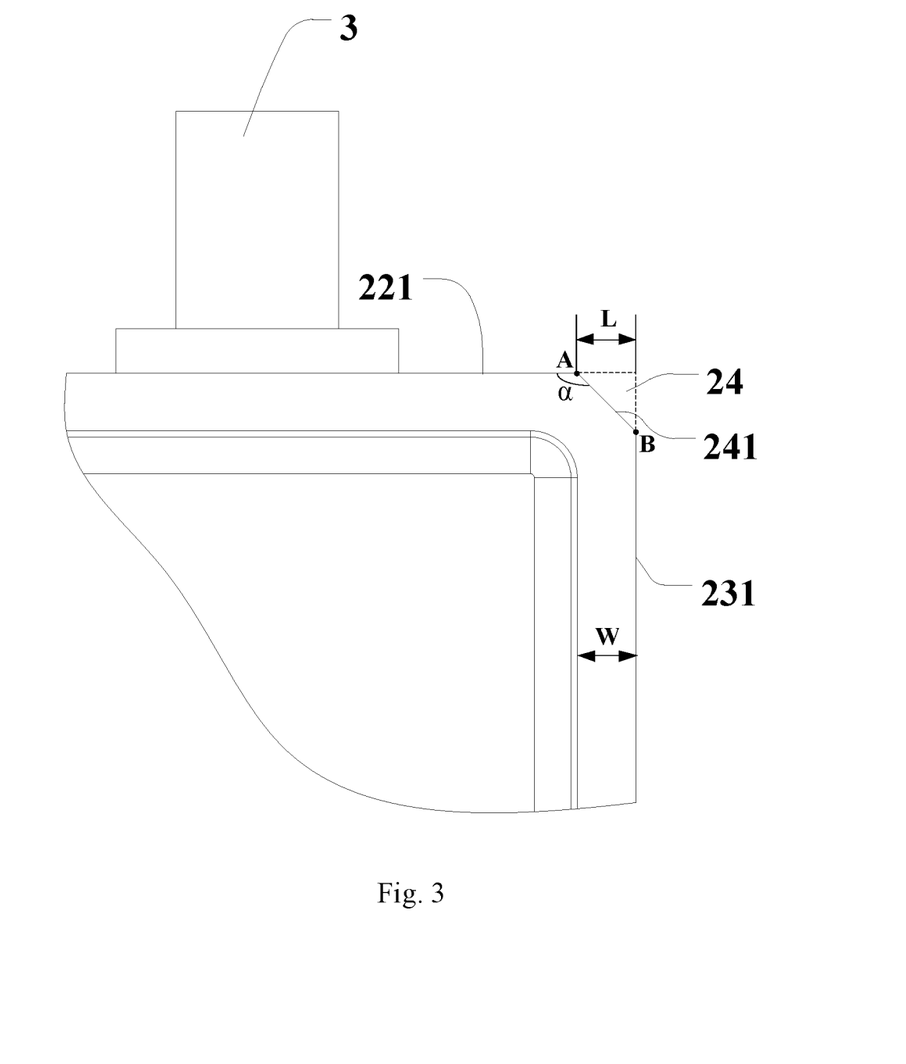
FIG. 3 is a partial schematic view of a battery according to a second embodiment of the present application.
Figure 4:
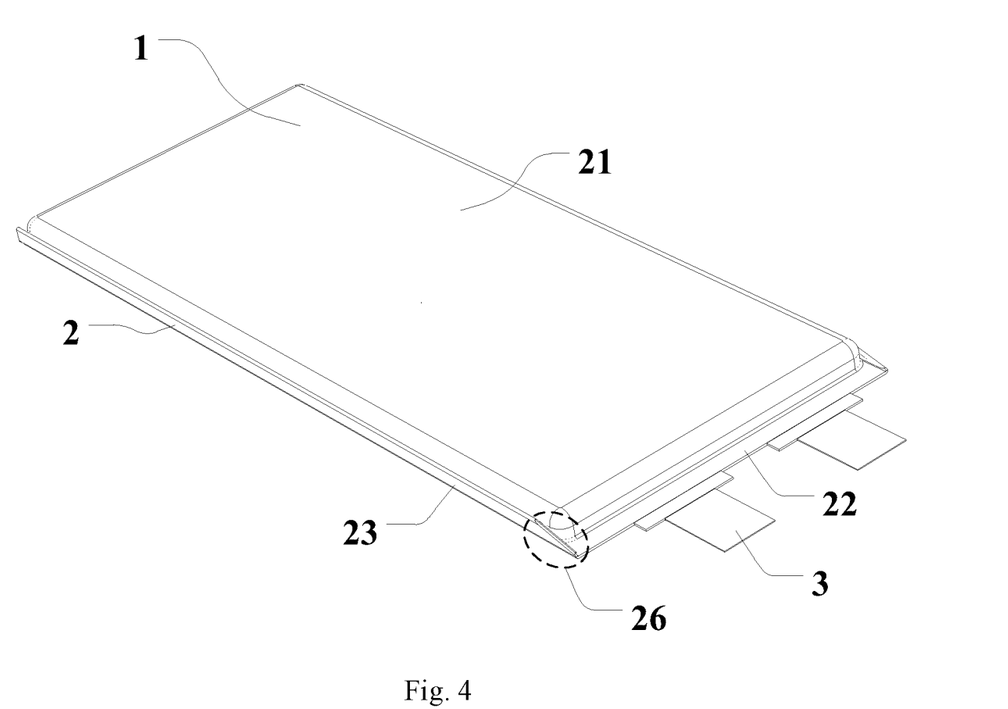
FIG. 4 is a structural schematic view of a battery according to a third embodiment of the present application.

Referring to FIGS. 2 to 4, embodiments of the present application provides a battery. The battery includes a cell 1, a packaging bag 2 configured to package the cell 1, and an electrode tab 3 connected with the cell 1. The packaging bag 2 includes a first packaging portion 21 configured to accommodate the cell 1, and a second packaging portion configured to seal the cell 1. The second packaging portion includes a top seal 22 configured to seal the electrode tab 3 and two side seals 23 intersecting the top seal 22. A notched structure 24 is formed at the intersection of the top seal 22 and the side seal 23. The side seal 23 is folded over along an edge of the side seal 23 adjacent to the first packaging portion 21, and fixed to an outer side surface of the first packaging portion 21.

In the embodiments of the present application, after the cell 1 is packaged by the packaging bag 2 of the battery, the resulting second packaging portion has the notched structure 24, and specifically, the notched structure 24 is located at the intersection of the top seal 22 and the side seal 23. Referring to FIG. 2 that shows a specific embodiment where the above notched structure 24 is illustrated by way of example, the notched structure 24 refers to a structure that is cut off at the intersection of the top seal 22 and the side seal 23. In a finished battery, only an edge 241 of the notched structure is visible.

In a battery manufacturing process, the side seal 23 is folded over along the edge of the side seal 23 adjacent to the first packaging portion, and fixed to the outer side surface of the first packaging portion 21. For example, if the side seal 23 can be directly folded over and bonded to the outer side surface of the first packaging portion 21, the notched structure 24 is located above an end of the cell 1 to form an edgefold protrusion 26. The edgefold protrusion 26 has the notched structure 24, and thus has a relatively low height in a direction perpendicular to the top seal 22. When the battery is in use, it is possible to reduce structural interference between the edgefold protrusion 26 and other components used cooperatively, and improve structural compactness and integration level when the user utilizes the battery.

In a specific embodiment, the process of forming the notched structure is not limited. For instance, a chamfering operation can be performed on a packaging film before the packaging bag is formed, then the notched structure is formed, and the packaging film is packaged to form a packaging bag; alternatively, the notched structure can be formed after a pressing process of the packaging bag is completed; alternatively, the notched structure can be formed after a packaging process of the packaging bag is completed.

It should be noted that, referring to FIG. 3, "a side edge 221 of the top seal" mentioned in this application refers to an edge of the packaging bag in a direction of the top seal 22, "a side edge 231 of the side seal" herein refers to an edge of the packaging bag in a direction of the side seal 23, and "an edge 241 of the notched structure" herein refers to an edge of the packaging bag in a direction of the notched structure 24.

It should be noted that, in embodiments of the present application, a minimum distance between the edge 241 of the notched structure and the edge of the side seal 23 adjacent to the first packaging portion is not less than a preset distance. Specifically, the above preset distance refers to a seal width that guarantees effective packaging of the cell by the packaging bag, and the seal width refers to a distance between an outer edge of the second packaging portion and an edge of the second packaging portion adjacent to the first packaging portion. The greater the seal width is, the better the safety performance of the cell packaged by packaging bag is, and the less likely it is to break the seal. Only when a seal width of the battery at least reaches the seal width that guarantees the effective packaging of the cell, it is possible to ensure the quality of the battery, and prevent liquid in the packaging bag of the cell from flowing out, which may result in battery damage or failure otherwise. For batteries of different specifications, the corresponding seal widths for effective packaging of the cell are also different. The preset distance in the embodiment of the present application needs to be determined according to the specifications of the actual product.

Referring to FIG. 3, in a preferred embodiment, a projected length of the edge 241 of the notched structure in a direction of the side edge 221 of the top seal and the width of the side seal 23 satisfy L≤W, in which L represents the projected length, and W represents the width of the side seal 23.

Further referring to FIG. 3, in the preferred embodiment, by means of the notched structure 24 in this embodiment, after the side seal 23 is folded over and fixed to the outer side surface of the first packaging portion 21, the size of the top seal 22 can be unchanged, which is advantageous for the user to assemble the remaining parts when using the above battery. In one specific embodiment, the projected length of the edge 241 of the notched structure in the direction of the side edge of the top seal 22 is equal to the width of the side seal 23, i.e. L=W, in which case the height of the edgefold protrusion 26 in the direction perpendicular to the top seal 22 can be reduced to a large extent.

Figure 5:
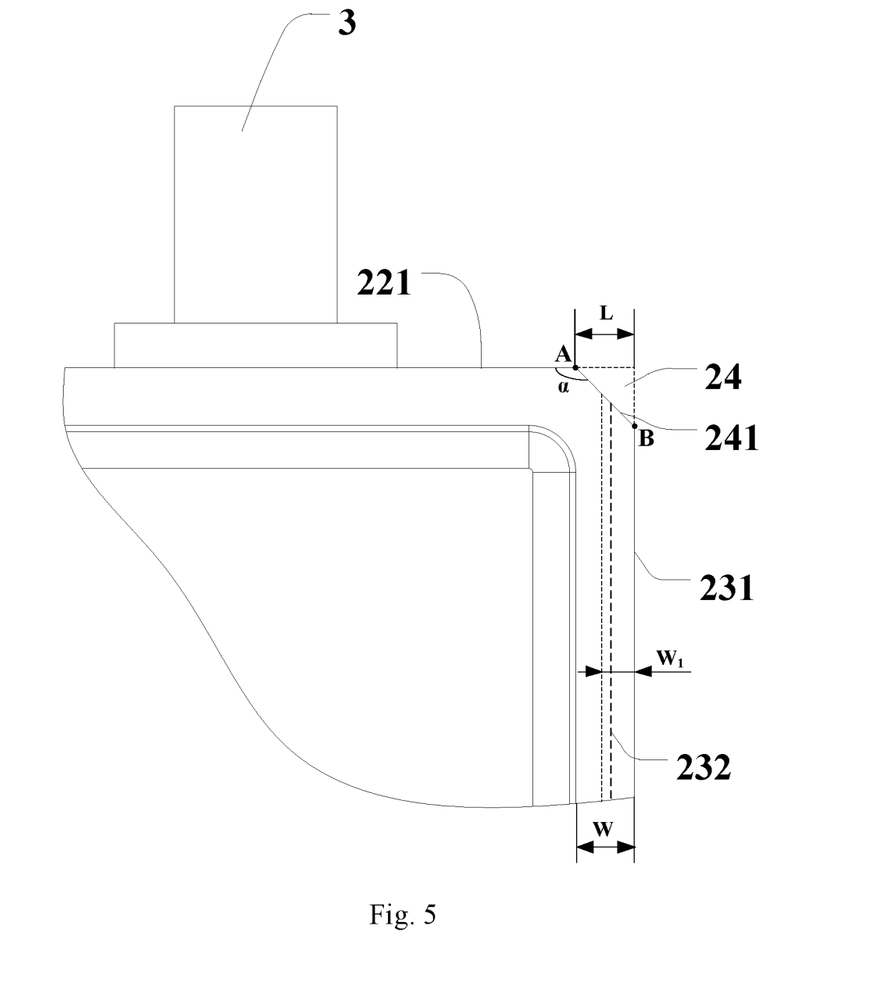
FIG. 5 is a partial schematic view of a battery according to a fourth embodiment of the present application.

Referring to FIG. 5, the side seal 23 includes a heat-seal zone and a non-sealed zone which are sequentially provided in a direction away from the side edge 231 of the side seal. The heat-seal zone has a width that satisfies $\frac{1}{5}W \leq W_1 \leq \frac{4}{5}W$, in which $W_1$ is the width of the heat-seal zone, and W is the width of the side seal 23.

In a specific embodiment, the width of the heat-seal zone is required to be not less than the seal with that ensures the packaging bag can package the cell effectively. Through analytical calculation by the inventors, when the width of the heat-seal zone reaches one fifth of the width of the side seal, the requirement on the seal width can be satisfied. In addition, the greater the width of the heat-seal zone is, the better the sealing effect of the battery is, thereby improving the safety performance of the battery. However, the heat-seal zone cannot be too large due to the limitation of a thickness of the cell.

In one preferred embodiment, the width of the heat-seal zone satisfies $W_1 = \frac{2}{5}W$, in which $W_1$ is the width of the heat-seal zone, and W is the width of the side seal 23.

Specifically, the width of the heat-seal zone can range from 0.7 mm to 1.3 mm, and for example, it can be 0.8 mm, 0.85 mm, 0.9 mm, 1.0 mm, 1.1 mm or 1.2 mm. When the width of the heat-seal zone is two fifths of the width of the side seal, the above seal width for the effective packaging of the cell can be satisfied, and the subsequent folding process and the like can be performed, and also, the cost can be saved, and the volume and weight of the battery can be decreased.

Figure 6:
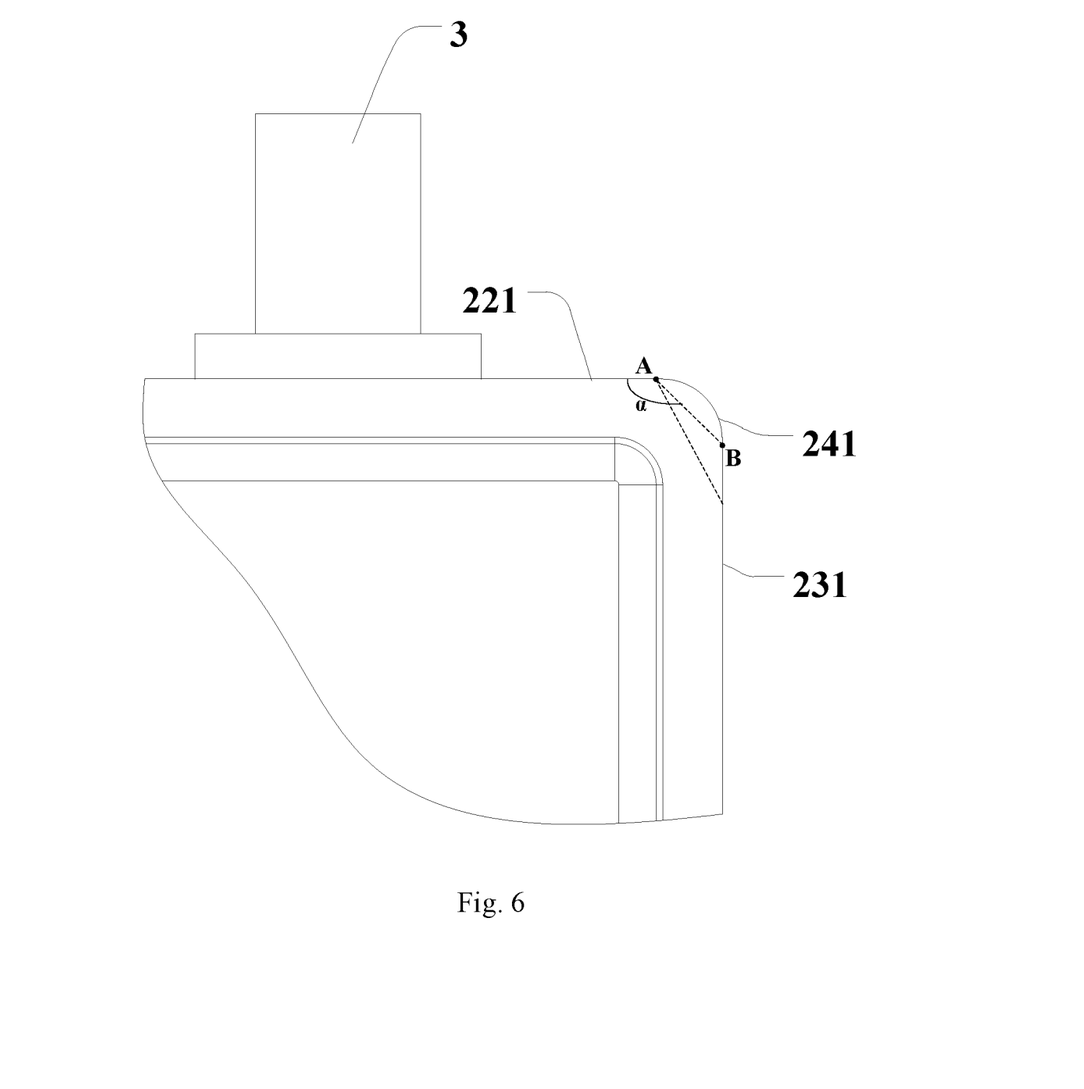
FIG. 6 is a partial schematic view of a battery according to a fifth embodiment of the present application.

Referring to FIGS. 5 and 6, in an optional embodiment, the edge 241 of the notched structure is not limited particularly in terms of its shape. That is, the edge 241 can be an oblique edge or a curved edge. The notched structure 24 with the oblique edge is easy to fabricate; the shape of the curved edge can be consistent with the shape of the corresponding edge of the cell. In this embodiment, under the condition that the minimum distance between the edge 241 of the notched structure and the first packaging portion 21 is not less than the preset distance, the size of the notched structure 24 can be designed to be relatively large, which is advantageous to further reduce the height of the edgefold protrusion 26 in the direction perpendicular to the top seal 22.

Referring back to FIG. 3, in preferred embodiments, the edge 241 of the notched structure intersects the side edge 221 of the top seal at point A, the edge 241 of the notched structure intersects the side edge 231 of the side seal at point B, and an angle α between a line connecting point A and point B and the side edge 221 of the top seal satisfies 125°≤α≤145°.

In this embodiment, the size of the notched structure 24 in the direction of the side edge of the top seal 22 can approximate that in the direction of the side edge of the side seal 23, and on the premise that the minimum distance between the edge 241 of the notched structure and the edge of the side seal 23 adjacent to the first packaging portion is not less than the preset distance, i.e., the packaging bag 2 achieves effective packaging, the notched structure 24 can be relatively large, which is advantageous to reduce the height of the edgefold protrusion 26 in the direction perpendicular to the top seal 22.

In a more preferred embodiment, the angle α between the line connecting point A and point B and the side edge 221 of the top seal satisfies 132°≤α≤138°. In this embodiment, the size of the notched structure 24 in the direction of the side edge of the top seal 22 can even more approximate that in the direction of the side edge of the side seal 23. For example, in a specific embodiment, if α=145°, the size of the notched structure 24 in the direction of the side edge of the top seal 22 is equal to that in the direction of the side edge of the side seal 23.

Figure 7:
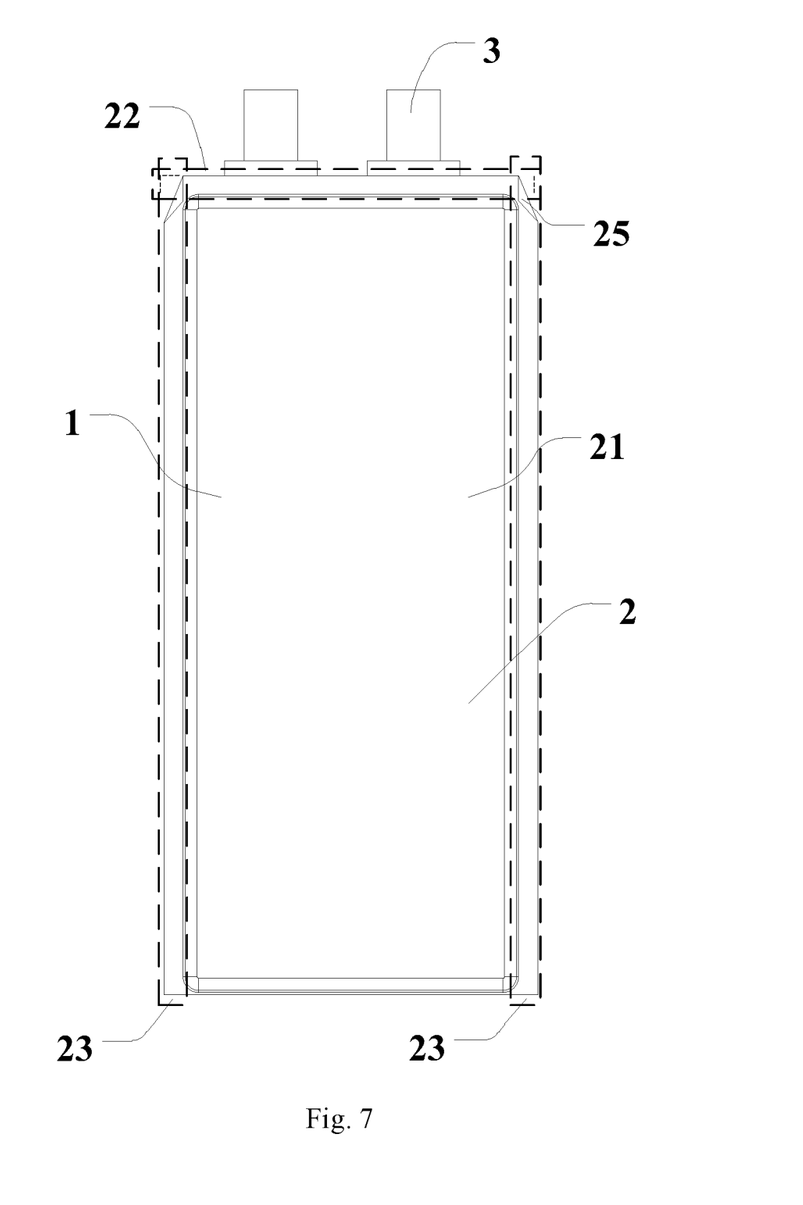
FIG. 7 is a structural schematic view of a battery according to a sixth embodiment of the present application.
Figure 8:
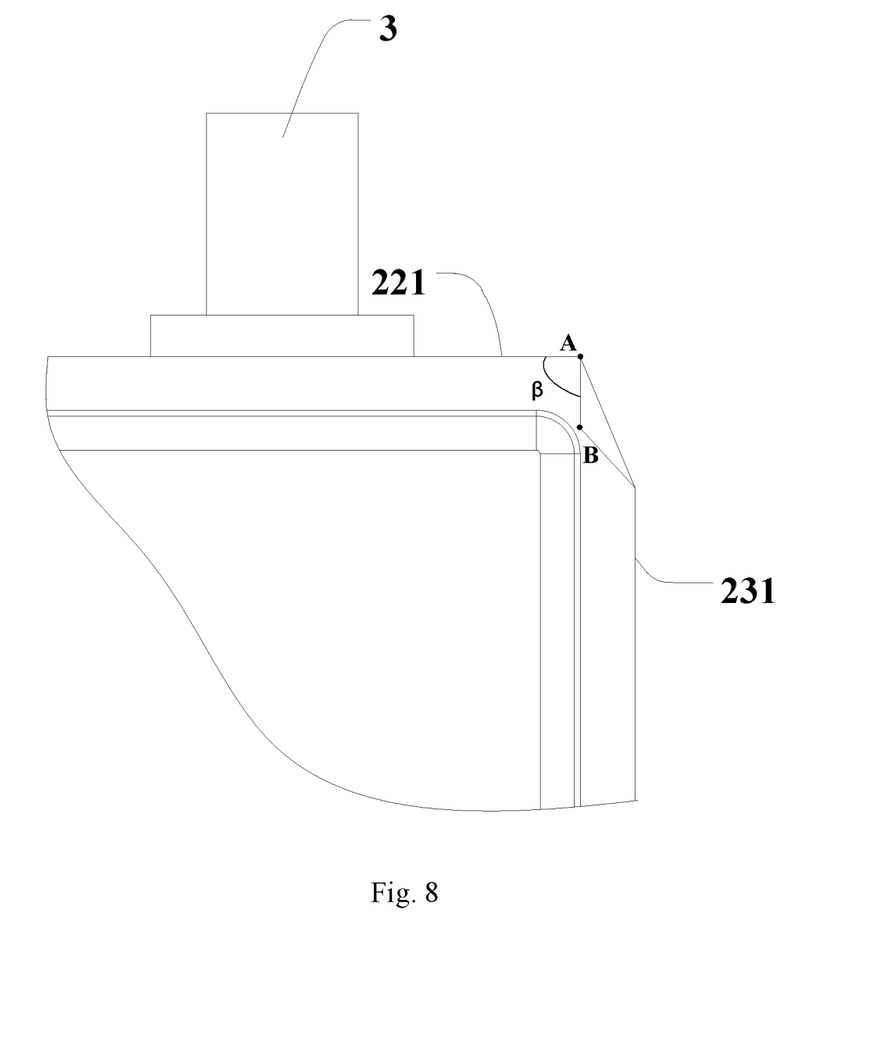
FIG. 8 is a partial schematic view of a battery according to a seventh embodiment of the present application.

Referring to FIGS. 7 and 8, in a specific embodiment, a side of the second packaging portion adjacent to the notched structure 24 includes a folding portion 25, the folding portion 25 is folded over and fixed to the second packaging portion, and the whole folding portion 25 is superposed on a surface of the second packaging portion.

In this embodiment, the second packaging portion includes the folding portion 25, such that on the one hand, the folded second packaging portion may generate a larger notch, and after the side seal 23 is folded over and fixed to the outer side surface of the first packaging portion 21, the height of the edgefold protrusion 26 in the direction perpendicular to the top seal 22 is further reduced; on the other hand, the edge 241 of the notched structure has an exposed sealed seam which may be easy to break, and after the folding portion 25 is folded over and fixed to the second packaging portion, the sealed seam can be protected from breaking easily, and hence the cell 1 can be packaged by the packaging bag 2 with an improved sealing effect, and it is not easy to break the seal. Specifically, the fact that the folding portion 25 is folded over and fixed to the second packaging portion and the whole folding portion 25 is superposed on the surface of the second packaging portion means that the folding portion 25 is only fixed to the second packaging portion after folded, and has no structural interference with the first packaging portion 21 of the packaging bag 2, such that the flatness of the folding portion 25 of the packaging bag 2 can be improved, and hence the packaging bag 2 is not easily unsealed and damaged.

Referring to FIG. 8, the edge 241 of the notched structure intersects the side edge 221 of the top seal at point A, the edge 241 of the notched structure intersects the side edge 231 of the side seal at point B, and after the folding portion 25 is folded over and fixed to the second packaging portion, an angle β between a line connecting point A and point B and the side edge 221 of the top seal satisfies 80°≤β≤110°.

In this embodiment, the line connecting the point A and the point B is approximately perpendicular to the side edge 221 of the top seal, such that when the side seal 23 is fixed to the outer side surface of the first packaging portion 21, the structural interference between the folding portion 25 and the first packaging portion 21 can be reduced. In addition, the area of the folding portion 25 can be relatively large, such that the height of the edgefold protrusion can be further reduced. In a more preferred embodiment, the angle β between the line connecting point A and point B and the side edge 221 of the top seal satisfies 87°≤β≤93°. After the folding portion 25 is folded, the line connecting point A and point B is more approximately perpendicular to the side edge 221 of the top seal.

Figure 9:
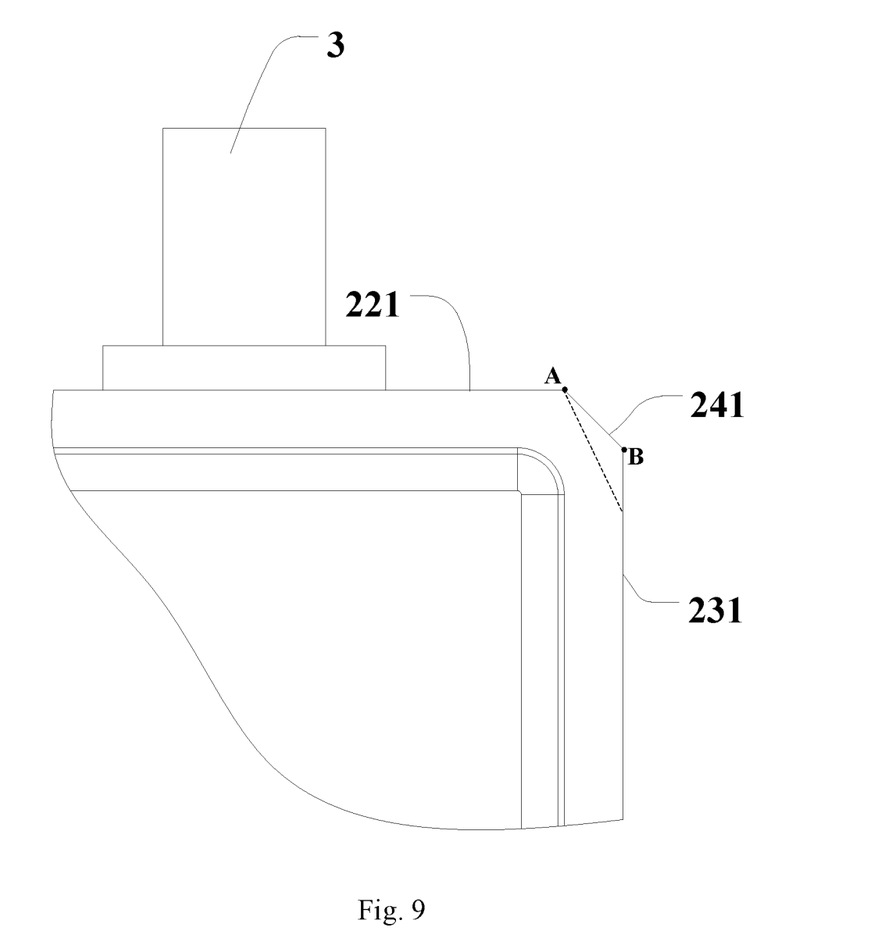
FIG. 9 is a partial schematic view of a battery according to an eighth embodiment of the present application.

Referring to FIG. 9, in a specific embodiment, a folding line of the folding portion 25 passes the intersection point A between the edge 241 of the notched structure and the side edge of the top seal 22. In this embodiment, the folding portion 25 is folded along the folding line that takes the intersection point between the edge 241 of the notched structure and the top seal 22 as a starting point. Thus, the size of the notch at the intersection between the top seal 22 and the side seal 23 can be further increased, and after the side seal 23 is folded over and fixed to the outer side surface of the first packaging portion 21, the height of the edgefold protrusion 26 in the direction perpendicular to the top seal 22 is further reduced.

In a preferred technical solution of the present application, the edge 241 of the notched structure is an oblique edge, and the angle α between the oblique edge and the side edge 221 of the top seal is 135°, and after the folding portion is folded along the folding line that passes the point A, the angle β between the oblique edge and the side edge 221 of the top seal is 90°. On the premise of satisfying the effective sealing, the height of the edgefold protrusion can be reduced to a maximum extent.

Referring to FIGS. 4 and 5, the side seal 23 is folded over and fixed to the outer side surface of the first packaging portion by means of a double-folded edge 224. The manner of the double-folded edge means that the side edge of the side seal 23 is folded once along a first folding line 232 in a direction close to the cell 1, and folded one more time along an edge of the side seal 23 adjacent to the first packaging portion 21 and fixed to the outer side surface of the first packaging portion 21. In this embodiment, an exposed sealed seam of the side edge of the side seal 23 can be enveloped inside and protected from breaking easily, and hence the cell 1 can be packaged by the packaging bag 2 with the improved sealing effect, and it is not easy to break the seal.

In a preferred embodiment, the first folding line 232 is located in the heat-seal zone, and the heat-seal zone has high strength. The solution can reduce the damage of the packaging bag due to folding and improve the safety performance of the packaging bag.

In a specific embodiment, an adhesive layer is provided between the double-folded edge and the outer side surface of the first packaging portion, that is, the double-folded edge is fixed to the outer side surface of the first packaging portion by bonding.

In a specific embodiment, the edge 241 of the notched structure of the second packaging portion is provided with a sealing tape. In addition, the side edge 231 of the side seal is provided with a sealing tape. After the packaging bag is sealed, the edge has a bare sealed seam, and the bare sealed seam is easy to unseal, causing damages due to liquid leakage of the battery or the like, and hence reducing the service life of the battery. Thus, this embodiment can protect the above sealed seam from breaking easily, enhance the sealing effect of the packaging bag, and improve the service life of the battery.

It is obvious to those skilled in the art that various modifications and variations may be made in the present application without departing from the spirit and scope of the application. Thus, if such modifications and variations of the present application are within the scope of the claims of the present application and the like, the present application is also intended to include these modifications and variations.

What is claimed is:

1. A battery, comprising:
a cell;
a packaging bag configured to package the cell; and
an electrode tab connected with the cell;
wherein, the packaging bag comprises:
a first portion configured to accommodate the cell and the first portion has a length direction, a width direction and a thickness direction; and,
a second portion configured to seal the cell by partially surrounding the first portion;
wherein the second portion comprises:
a top seal adjacent one end of the first portion along the width direction of the first portion and the electrode tab protrudes from the top seal; and,
two side seals at two opposite sides of the first portion along the length direction of the first portion and intersecting two opposite ends of the top seal, wherein each side seal comprises a heat-seal zone and a non-sealed zone sequentially provided in a direction away from a side edge of the side seal;
a notched structure is formed at an intersection of the top seal and each of the two side seals, and each side seal is folded over along an edge of the side seal adjacent to the first portion and fixed to an outer side surface of the first portion;
wherein in the thickness direction, each of the folded side seals has a height that is less than a thickness of the battery.

2. The battery according to claim 1, wherein a projected length of an edge of the notched structure in a direction of a side edge of the top seal and a width of the side seal satisfy L≤W, in which L represents the projected length, and W represents the width of the side seal.

3. The battery according to claim 1, wherein a width of the heat-seal zone satisfies $\frac{1}{5}W \leq W_1 \leq \frac{4}{5}W$, in which $W_1$ is the width of the heat-seal zone, and W is the width of the side seal.

4. The battery according to claim 3, wherein the width of the heat-seal zone satisfies $W_1 = \frac{2}{5}W$, in which $W_1$ is the width of the heat-seal zone, and W is the width of the side seal.

5. The battery according to claim 1, wherein the edge of the notched structure comprises an oblique edge or a curved edge.

6. The battery according to claim 1, wherein the edge of the notched structure intersects a side edge of the top seal at point A, the edge of the notched structure intersects a side edge of the side seal at point B, and an angle α between a line connecting point A and point B and the side edge of the top seal satisfies $125° \le \alpha \le 145°$.

7. The battery according to claim 6, wherein the angle α between the line connecting point A and point B and the side edge of the top seal satisfies $132° \le \alpha \le 138°$.

8. The battery according to claim 1, wherein a side of the second portion adjacent to the notched structure comprises a folding portion, the folding portion is folded over and fixed to the second portion, and the whole folding portion is superposed on a surface of the second portion.

9. The battery according to claim 8, wherein an edge of the notched structure intersects a side edge of the top seal at point A, the edge of the notched structure intersects a side edge of the side seal at point B, and after the folding portion is folded over and fixed to the second portion, an angle β between a line connecting point A and point B and the side edge of the top seal satisfies $80° \le \beta \le 110°$.

10. The battery according to claim 9, wherein the angle β between the line connecting point A and point B and the side edge of the top seal satisfies $87° \le \beta \le 93°$.

11. The battery according to claim 8, wherein a folding line of the folding portion passes an intersection point between the edge of the notched structure and the side edge of the top seal.

12. The battery according to claim 1, wherein the side seal is folded twice and fixed to the surface of the first portion.

13. The battery according to claim 12, wherein an adhesive layer is provided between the folded side seal and the surface of the first portion.

14. The battery according to claim 1, wherein an edge of the notched structure of the second portion is provided with a sealing tape.

15. The battery according to claim 1, wherein a side edge of the side seal is provided with a sealing tape.

\* \* \* \* \*